(12) United States Patent
Mao

(10) Patent No.: US 7,533,014 B2
(45) Date of Patent: May 12, 2009

(54) METHOD AND SYSTEM FOR CONCURRENT USE OF TWO OR MORE CLOSELY COUPLED COMMUNICATION RECOGNITION MODALITIES

(75) Inventor: Xiaodong Mao, Foster City, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 10/204,058

(22) PCT Filed: Dec. 27, 2000

(86) PCT No.: PCT/CN00/00732

§ 371 (c)(1),
(2), (4) Date: Aug. 19, 2003

(87) PCT Pub. No.: WO02/052394

PCT Pub. Date: Jul. 4, 2002

(65) Prior Publication Data

US 2005/0102138 A1 May 12, 2005

(51) Int. Cl.
*G06F 17/27* (2006.01)

(52) U.S. Cl. ............................. 704/9; 704/231; 704/257

(58) Field of Classification Search .................. 704/9, 704/235, 270, 10, 231, 236, 240, 243, 244, 704/257, 251
See application file for complete search history.

(56) References Cited

U.S. PATENT DOCUMENTS 5,502,774 A * 3/1996 Bellegarda et al. .......... 382/159
5,855,000 A * 12/1998 Waibel et al. ............... 704/235
6,438,523 B1 * 8/2002 Oberteuffer et al. ......... 704/270

(Continued)

FOREIGN PATENT DOCUMENTS

CN 1112252 A1 11/1995

(Continued)

OTHER PUBLICATIONS

PCT International Search Report, PCT/CN00/00732, Mar. 28, 2001, 3 pages.

*Primary Examiner*—Huyen X. Vo
(74) *Attorney, Agent, or Firm*—Blakely, Sokoloff, Taylor & Zafman LLP

(57) ABSTRACT

A method and system are provided in which a speech recognition system and one or more other input modalities are run in parallel. The system is especially useful in easing the Chinese input obstruction due to the difficulty of conforming Chinese ideograms to typical processor system input devices. The system allows a user to concurrently input information using different modalities. For example, a user may input spoken words and written characters (or data through other modalities). Each modality produces a list of possible words and their probability of being the input. If the most probable possible word is the same for both modalities then it is selected as the input. If not, an acoustic profile of the most probable speech input or an average acoustic profile of the possible speech inputs is used to validate a possible word of the other modalities or present a list of more probable possibilities to the user. The user may modify the written characters (or other input) from the provided possibilities. In this way the differing input modalities do not interfere with each other, but instead complement each other.

21 Claims, 4 Drawing Sheets

U.S. PATENT DOCUMENTS 6,484,136 B1 * 11/2002 Kanevsky et al. .............. 704/9

FOREIGN PATENT DOCUMENTS

| CN | 1115057 | A | 1/1996 |
| CN | 1246674 | A | 3/2000 |
| CN | 1257240 | A | 6/2000 |
| EP | 0505621 | A2 | 9/1992 |

* cited by examiner

Input

METHOD AND SYSTEM FOR CONCURRENT USE OF TWO OR MORE CLOSELY COUPLED COMMUNICATION RECOGNITION MODALITIES

FIELD OF THE INVENTION

The present invention relates generally to a system for the translation of human input to electronic data, and more specifically to the concurrent use of two or more closely coupled input modalities to increase the accuracy and robustness of such a system while making the system easier to use.

BACKGROUND

Speech recognition systems or handwriting recognition systems for the translation of human input to electronic data are currently being developed.

One type of speech recognition system is the command and control type. The command and control type uses a grammar to format the input for more accurate recognition. A grammar may constrain the input to the system in some way so as to reduce the number of possible inputs. For example the input may be constrained to be an "action" followed by a "target" of the action. For example, if the user inputs the spoken words "open a file" then "open" would be recognized from a group of action words and "file" would be recognized from a group of target words. The constraints placed upon the system by a grammar are language specific and can yield high recognition accuracy.

A second type of speech recognition system is the dictation type. The dictation type of speech recognition is not constrained by a specific grammar, but by a less stringent language modeling. Whatever input is spoken the system will attempt to recognize the input word by word using statistical information. This system is more flexible, but yields lower recognition accuracy. The accuracy level of the dictation type of speech recognition system is currently too low to provide a generally practical system.

These two types of speech recognition systems have their counterparts in the handwriting recognition arena. The "pen gesture" type of handwriting recognition system is analogous to the command and control type of speech recognition system in that the input is constrained by formatted structures known as a template. The less structured handwriting recognition system is simply known as handwriting and attempts to recognize handwritten input at the letter or word level without a required format.

It has been recognized that using both a speech recognition system and a handwriting recognition system in tandem could significantly improve the speed and accuracy of a translation system. The coupling of the constrained type of each system (i.e., the command and control type of speech recognition system and the pen gesture type of handwriting system) has been possible because both use a constraint system. The command and control type of speech recognition system uses a grammar and the pen gesture type of handwriting recognition system uses a template. The grammar and the template function similarly in their respective systems. The coupling of the two modalities has yielded improved system performance.

A more flexible and versatile system would be the coupling of the least constrained types of each system (i.e., the dictation type of speech recognition system and the handwriting type of handwriting recognition system).

An accurate, robust, and easy to use translation system for human input is especially important for Chinese language users. The Chinese language is made up of tens of thousands of pictographic words known as ideograms that are combined to create other words. One common way to input information to a processing system is through the use of Pinyin. Pinyin is a system for transforming Chinese ideograms into Roman alphabet based words. For many people who use Chinese as their native language, it is an arduous task to input information into a processing system. This task discourages many from accessing the many devices that rely on human input to a processing system. Whereas in the English language many people can type words faster than they can speak them, this is much more difficult when the words must be initially translated from Chinese ideograms.

BRIEF DESCRIPTION OF THE DRAWINGS

The present invention is illustrated by way of example and not limited by the figures of the accompanying drawings in which like references indicate similar elements and in which.

DETAILED DESCRIPTION

1.1 Overview

According to one aspect of the present invention a method and system are provided in which a speech recognition system and one or more other input modalities are run in parallel. The system allows a user to concurrently input information using different modalities. For example, a user may input spoken words and one or more other type of input including written characters (e.g., Chinese ideograms or pinyin), and body movements such as sign language, among others.

The differing input modalities do not interfere with each other, but instead complement each other. The system cross-references and indexes the output from the individual input modalities to provide a faster, more accurate, and more robust translation system. An acoustic profile of the most probable speech input or an average acoustic profile of the possible speech inputs is used to validate the input through other modalities.

Figure 1:
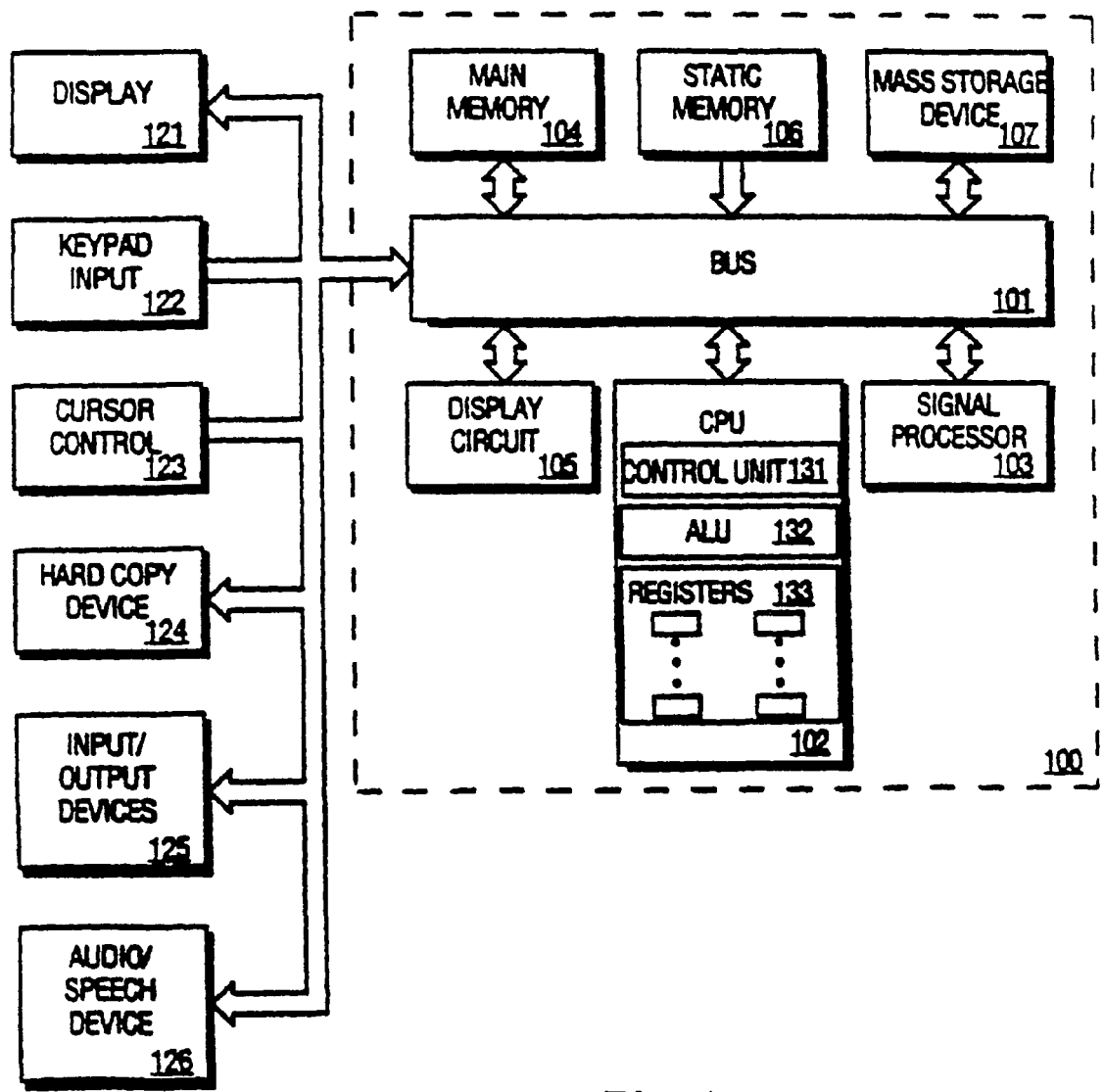
FIG. 1 is a diagram illustrating an exemplary digital processing system for implementing the present invention.

FIG. 1 is a diagram illustrating an exemplary digital processing system 100 for implementing the present invention. The input recognition and data processing techniques described herein can be implemented and utilized within digital processing system 100, which can represent a general-purpose computer, portable computer, hand-held electronic device, or other like device. The components of digital processing system 100 are exemplary in which one or more components can be omitted or added. For example, one or more memory devices can be utilized for digital processing system 100.

Referring to FIG. 1, digital processing system 100 includes a central processing unit 102 and a signal processor 103 coupled to a display circuit 105, main memory 104, static memory 106, and mass storage device 107 via bus 101. Digital processing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for digital processing system 100. CPU 102 or signal processor 103 or both can be used to process information and/or signals for digital processing system 100. Signal processor 103 can be used to process speech or audio information and signals for speech processing and recognition. Alternatively, CPU 102 can be used to process speech or audio information and signals for speech processing or recognition. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. For example, main memory 104 may store speech or audio information and instructions to be executed by signal processor 103 to process the speech or audio information. Main memory 104 may also store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for digital processing system 100.

Display 121 can be, e.g., a cathode ray tube (CRT) or liquid crystal display (LCD). Display device 121 displays information or graphics to a user. Digital processing system 101 can interface with display 121 via display circuit 105. Keypad input 122 is a alphanumeric input device with an analog to digital converter, for capturing sounds of speech in an analog form and transforming handwritten data into digital form, which can be used by signal processor 203 and/or CPU 102, for handwriting recognition and for communicating information and command selections to digital processing system 100. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to digital processing system 100. For example, a video camera can be coupled to digital processing system 100 through which video input could be received by the signal processor 203 and/or CPU 102. Audio/speech device 126 can be, e.g., a microphone with an analog to digital converter, for capturing sounds of speech in an analog form and transforming the sounds into digital form, which can be used by signal processor 203 and/or CPU 102, for speech processing or recognition.

The speech processing techniques described herein can be implemented by hardware and/or software contained within digital processing system 100. For example, CPU 102 or signal processor can execute code or instructions stored in a machine-readable medium, e.g., main memory 104, to process or to recognize speech.

The machine-readable medium may include a mechanism that provides information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 2A:
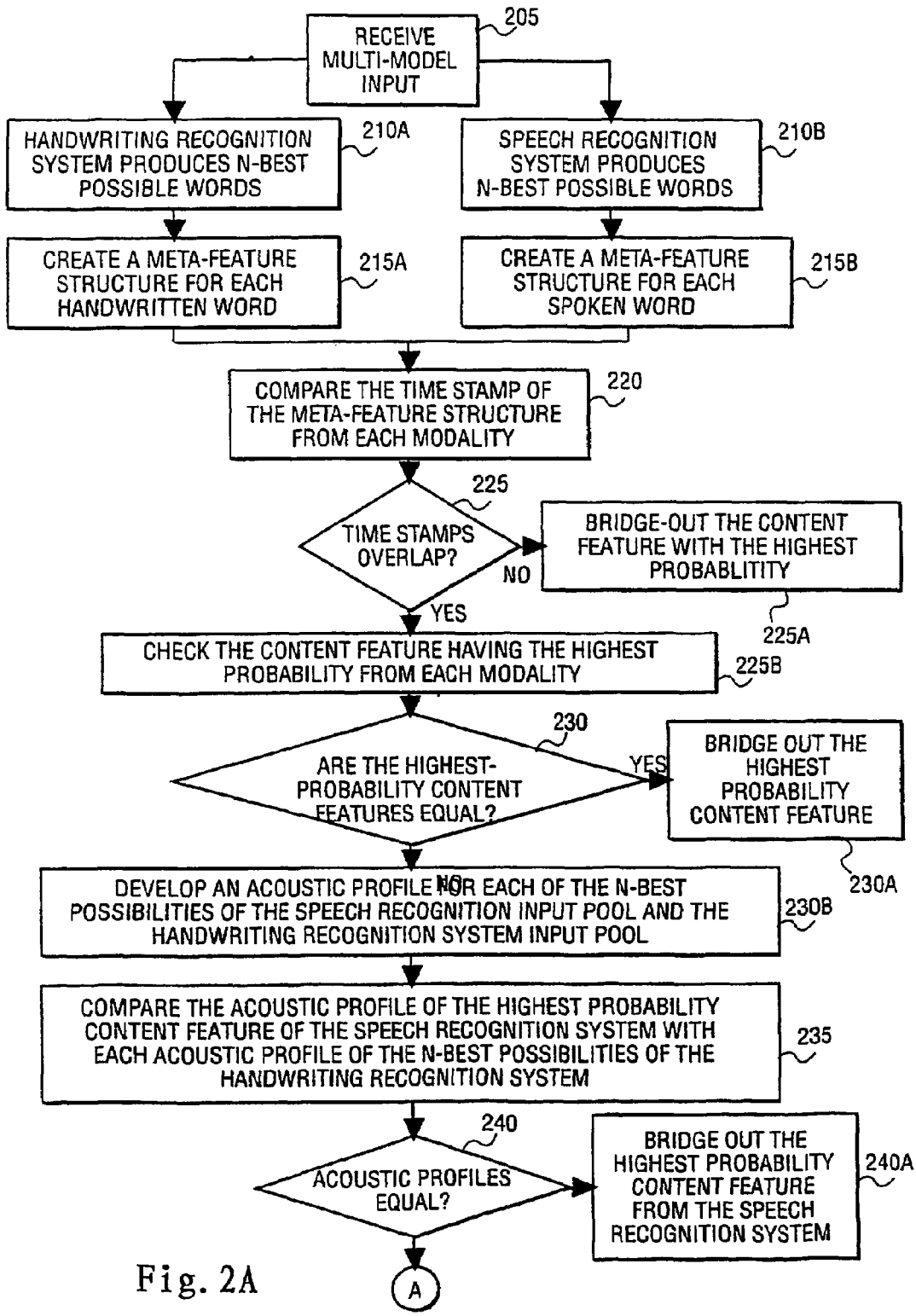
FIGS. 2A and 2B depict a process flow diagram of one embodiment of the present invention.
Figure 2B:
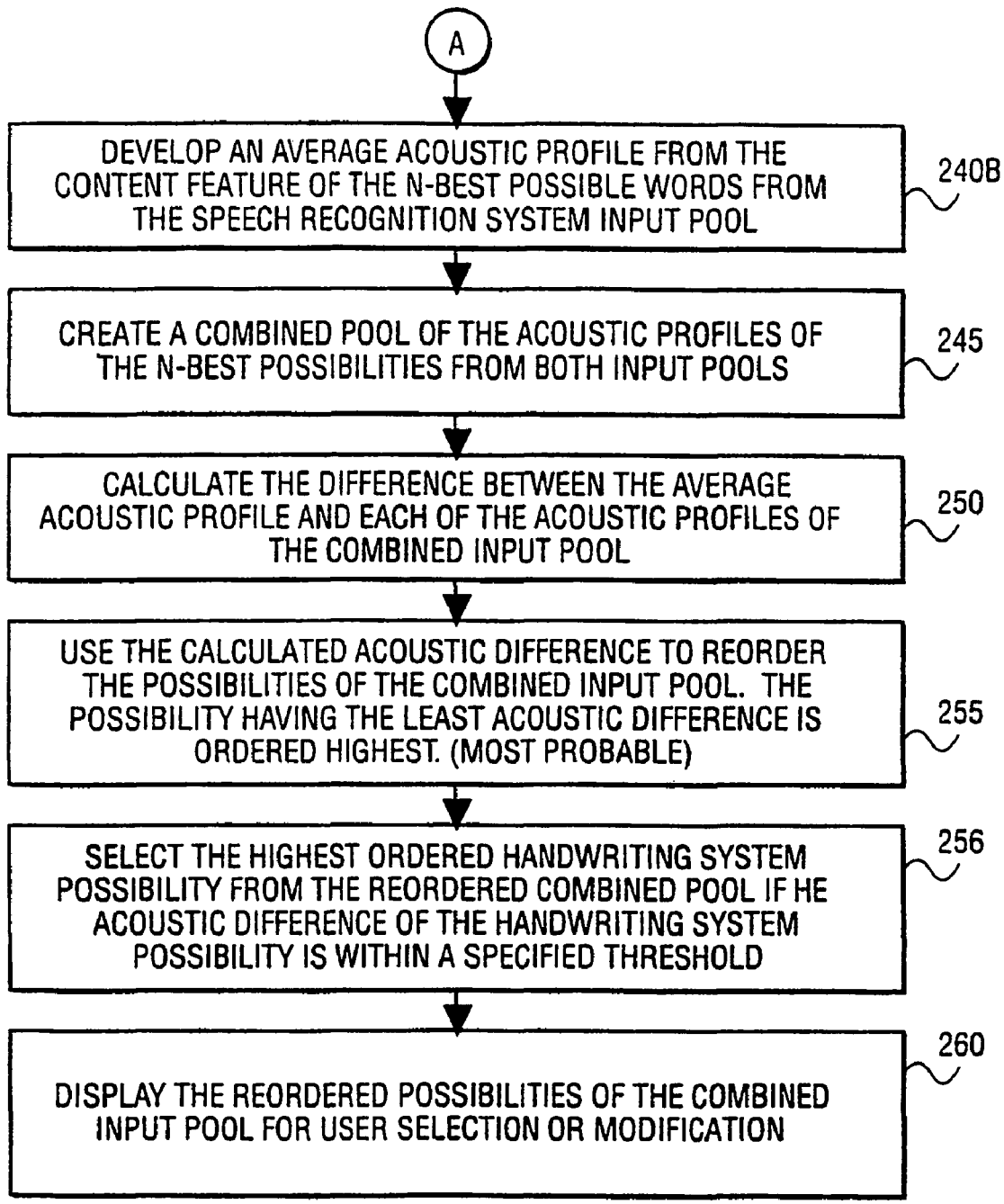

FIGS. 2A and 2B depict a process flow diagram of one embodiment of the present invention. The process 200 begins in FIG. 2A at operation 205 in which the system receives input through more than one modality. The process 200 shows a handwriting recognition system (FRS) coupled to a speech recognition system (SRS). Other input modalities (e.g., sign language) may be added in alternative embodiments.

At operation 210*a* the FRS produces n-best possibilities for the input handwriting and in operation 210*b* the SRS produces n-best possibilities for the input speech. For example, for a handwritten input of "rat" the HRS might produce an n-best input pool of (rat, hat, not, hot). For a spoken input of "rat" the SRS might produce an n-best input pool of (rat, rad, rut, writ): The n-best possibilities for each modality are ordered based on a probability assigned by the particular recognition system.

At operation 215*a* and 215*b*, a meta-feature structure is created for each of the n-best input pools for each input word from the HRS modality and from the SRS modality. The meta-feature structure takes the following form.

meta-feature structure={Probability, Start timestamp, {Content}, End timestamp}

The meta-feature structure includes the input pool word labeled "Content" together with the system-determined probability that the "Content" is the word the user input. Also included in the meta-feature structure is a start timestamp and an end timestamp for the particular input. At operation 220 the timestamps from the meta-feature structure of each modality are compared. Typically there may be some delay between corresponding written and spoken input. At operation 225 the system uses the start and end timestamps of each modality to determine if the duration of each overlaps within some predetermined time differential. At operation 225*a* there is no overlap of the input duration time for each modality. This indicates that the user input data using only one modality (i.e., the user either spoke or wrote, but not both at the same time). In this most simple case the system simply outputs the "Content" feature of the meta-file structure having the highest probability for the modality that was used.

At operation 225*b* the input duration does overlap for two or more modalities. This means the user input data using more than one modality. The system checks the "Content" feature having the highest probability for each of the modalities that were used. At operation 230 the system determines if the most likely output from each modality is the same. If so, the system outputs that "Content" feature (i.e., the "Content" feature having the highest probability in each modality used) at operation 230*a*. In this case the system has used each of the modalities as a redundant check upon the other(s).

At operation 230*b* the highest probability "Content" feature of each modality is not equal. This means for example that the FRS has determined that the user input is most likely a certain word, and the SRS has determined that the user input is most likely some other word. The system will then develop an acoustic profile for the n-best possibilities of the SRS and the n-best possibilities of the HRS. The system then uses a Gaussian distribution to determine if there is a match between the acoustic profile of the highest probability "Content" feature from the SRS input pool and the acoustic profile of any of the n-best possibilities from the HRS input pool at operation 235. For Example, for a spoken input of "rat" the SRS might produce a highest probability "Content" feature of rat. For the handwritten input of "rat" the FRS might produce an n-best input pool of (hat, not, rat, hot). This happens because the letter "r", when written, may appear similar to the letters "h" and "n", and the letter "a" may appear similar to "o". When handwritten, "hat" may appear similar to "rat", but their acoustic profiles may not appear similar at all. Therefore, in the above example the acoustic profile of the highest probability "Content" feature from the SRS input pool will match the acoustic profile of a less probable possibility in the HRS input pool. Because it is the only one that matches the acoustic profile it will be selected as the correct output.

Figure 3:
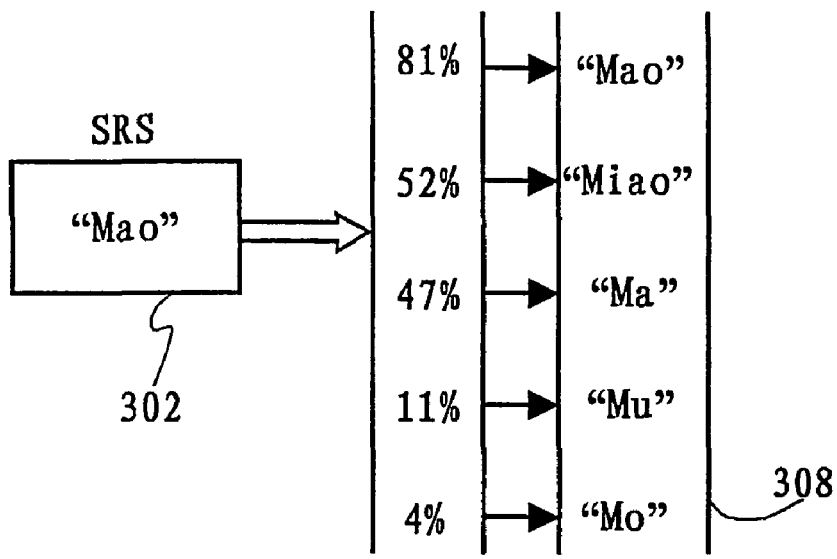
FIG. 3 shows a simplified example of a system output according to one embodiment of the present invention.
Figure 3:
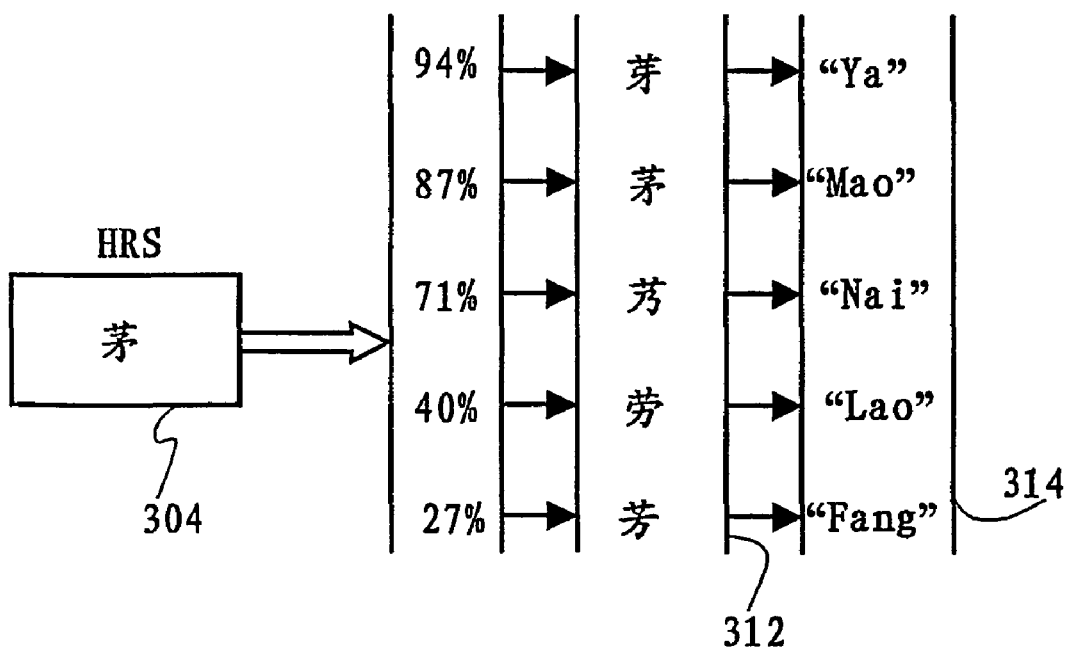

This method has a high degree of accuracy when translating Chinese ideograms because similar ideograms generally have very different acoustic profiles. When an acoustic profile is made of the highest probability "Content" feature from the SRS input pool it will likely match at most one of the pinyin-based n-best possibilities from the FRS input pool. FIG. 3 shows a simplified example of system output according to one embodiment. In example 300 shown in FIG. 3, input 302 to the SRS is the spoken word "mao" and input 304 is the corresponding handwritten Chinese ideogram. The resultant SRS n-best possibilities 308 for the SRS input 302 are very close in pronunciation to the spoken input 302. As shown "mao" is among the possibilities, and has the highest probability at 81%, therefore an acoustic profile will be made for "mao".

The resultant HRS n-best possibilities 312 for the HRS input 304 are very similar looking Chinese ideograms. The ideogram corresponding to "mao" is among the possibilities and has the second highest probability at 87%. However, words 314 corresponding to the Chinese ideograms would not have a similar pronunciation (i.e., acoustic profile).

Referring to FIG. 2A, the acoustic profiles are compared at operation 240, and if a match is found it is output at operation 240a. For example, using the data of FIG. 3; "yia", when depicted as a Chinese ideogram, had the highest probability of being the input word. However, the acoustic profile of "Yia" would not match the acoustic profile of the highest probability content feature from the SRS (i.e., "mao"). Only one of the HRS n-best possibilities yields an acoustic profile that matches the acoustic profile of the highest probability content feature from the SRS and that is the ideogram corresponding to "mao" which is therefore selected. There may not be any acoustic profiles of the n-best possibilities of the FRS input pool that match the acoustic profile of the highest probability content feature from the SRS.

Process 200 continues in FIG. 2B. At operation 240b, shown in FIG. 2B the acoustic profile of the highest probability "Content" feature from the SRS input pool does not match the acoustic profile of any of the acoustic profiles from the n-best possibilities of the FRS input pool. The system then develops an average acoustic profile from the acoustic profiles of the n-best possibilities of the SRS input pool. At operation 245 the acoustic profiles for the n-best possibilities of the SRS and the n-best possibilities of the FRS are combined in one input pool. The system then compares the average acoustic profile from the acoustic profiles of the n-best possibilities of the SRS input pool to all of the acoustic profiles in the combined input pool. At operation 250 the difference is calculated between the average acoustic profile of the n-best possibilities of the SRS input pool and each of the acoustic profiles in the combined input pool. At operation 255 the difference is used to reorder the possibilities of the combined input pool. That is, the possible input of the combined input pool having an acoustic profile with the least difference from the average acoustic profile of the SRS input pool will now be ordered highest (i.e., deemed to be most probable). The other possibilities are likewise ordered. At operation 256 the highest ordered possibility produced by the HRS is selected if the calculated difference between the acoustic profile of this possibility and the average acoustic profile is below a specified threshold. If the difference in acoustic profiles is below the specified threshold it may be selected even though possibilities produced by the SRS may be ordered higher (i.e., have acoustic profiles that differ from the average acoustic profile by a smaller amount). It may be that the calculated difference between the average acoustic profile and the acoustic profile of the highest ordered possibility produced by the FRS is above the specified threshold. In this case the highest ordered possibility produced by the IRS may not be selected.

At operation 260 the reordered possibilities from the combined input pool are presented to the user to choose the input. Alternatively, only the most probable portion of the reordered possibilities is presented. The user may doodle pen gesture commands to simultaneously alter the input character from the possibilities presented. In an embodiment using Chinese ideograms as handwritten input, the user may write pinyin corresponding to the ideograms in order to acoustically refine the possible selection.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

I claim:

1. A method comprising:
   receiving an input word through a plurality of input modalities;
   ascertaining an input pool for each input modality, each input pool containing possible words ordered based upon a probability of being the input word;
   identifying a highest probability word from each input pool, the highest probability word being a word having a highest probability among the possible words in the input pool;
   developing a first acoustic profile for the highest probability word of a first input pool;
   developing second acoustic profiles for the possible words of a second input pool, each of the second acoustic profiles corresponding to one of the possible words of the second input pool;
   comparing the first acoustic profile of the first input pool with each of the second acoustic profiles of the second input pool; and
   selecting the highest probability word of the first input pool as a recognized word in response to a determination that the first acoustic profile matches one of the second acoustic profiles.

2. The method of claim 1, wherein the first input pool corresponds to an input modality of speech.

3. The method of claim 2, wherein the second input pool corresponds to an input modality of handwriting.

4. The method of claim 3, wherein the handwriting is Chinese ideograms.

5. The method of claim 3, wherein the possible words are written in pinyin.

6. The method of claim 5, further comprising:
   developing an average acoustic profile for the possible words of the speech input pool;
   developing an acoustic profile for each of the possible words of the handwriting input pool and the speech input pool to create a combined input pool;
   calculating a difference between the average acoustic profile and each of the acoustic profiles of the combined input pool;
   reordering the possible words of the combined input pool based upon the difference, such that the possible word of the combined input pool having an acoustic profile with a least difference from the average acoustic profile is ordered first;

selecting a possible word produced by handwriting from the combined input pool, the selected possible word having the least difference among the possible words of the handwriting input pool and the least difference being below a specified threshold;

displaying the reordered possible words of the combined input pool; and receiving user modification to a handwriting input to refine the possible words in the handwriting input pool.

7. An apparatus comprising:

means for receiving an input word through a plurality of input modalities;

means for ascertaining an input pool for each input modality, the input pool containing possible words ordered based upon a probability of being the input word;

means for identifying a highest probability word from each input pool, the highest probability word being a word having a highest probability among the possible words in the input pool;

means for developing a first acoustic profile for the highest probability word of a first input pool;

means for developing second acoustic profiles for the possible words of a second input pool, each of the second acoustic profiles corresponding to one of the possible words of the second input pool;

means for comparing the first acoustic profile of the first input pool with each of the second acoustic profiles of the second input pool; and means for selecting the highest probability word of the first input pool as a recognized word in response to a determination that the first acoustic profile matches one of the second acoustic profiles.

8. The apparatus of claim 7, wherein the first input pool corresponds to an input modality of speech.

9. The apparatus of claim 8, wherein the second input pool corresponds to an input modality of handwriting.

10. The apparatus of claim 9, wherein the handwriting is Chinese ideograms.

11. The apparatus of claim 9, wherein the possible words are written in pinyin.

12. The apparatus of claim 11, further comprising:

means for developing an average acoustic profile for the possible words of the speech input pool;

means for developing an acoustic profile for each of the possible words of the handwriting input pool and the speech input pool to create a combined input pool;

means for calculating a difference between the average acoustic profile and each of the acoustic profiles of the combined input pool;

means for reordering the possible words of the combined input pool based upon the difference, such that the possible word of the combined input pool having an acoustic profile with a least difference from the average acoustic profile is ordered first;

means for selecting a possible word produced by handwriting from the combined input pool, the selected possible word having the least difference among the possible words of the handwriting input pool and the least difference being below a specified threshold;

means for displaying the reordered possible words of the combined input pool; and means for receiving user modification to a handwriting input to refine the possible words in the handwriting input pool.

13. A machine-readable medium that provides executable instructions, which when executed by a digital processing system, cause the set of processors to perform a method comprising:

receiving an input word through a plurality of input modalities;

ascertaining an input pool for each input modality, the input pool containing possible words ordered based upon a probability of being the input word;

identifying a highest probability word from each input pool, the highest probability word being a word having a highest probability among the possible words in the input pool;

developing a first acoustic profile for the highest probability word of a first input pool;

developing second acoustic profiles for the possible words of a second input pool, each of the second acoustic profiles corresponding to one of the possible words of the second input pool;

comparing the first acoustic profile of the first input pool with each of the second acoustic profiles of the second input pool; and selecting the highest probability word of the first input pool as a recognized word in response to a determination that the first acoustic profile matches one of the second acoustic profiles.

14. The machine-readable medium of claim 13, wherein the first input pool corresponds to an input modality of speech.

15. The machine-readable medium of claim 14, wherein the second input pool corresponds to an input modality of handwriting.

16. The machine-readable medium of claim 15, wherein the handwriting is Chinese ideograms.

17. The machine-readable medium of claim 15, wherein the possible words are written in pinyin.

18. The machine-readable medium of claim 17, further comprising:

developing an average acoustic profile for the possible words of the speech input pool;

developing an acoustic profile for each of the possible words of the handwriting input pool and the speech input pool to create a combined input pool;

calculating a difference between the average acoustic profile and each of the acoustic profiles of the combined input pool;

reordering the possible words of the combined input pool based upon the difference, such that the possible word of the combined input pool having an acoustic profile with a least difference from the average acoustic profile is ordered first;

selecting a possible word produced by handwriting from the combined input pool, the selected possible word having the least difference among the possible words of the handwriting input pool and the least difference being below a specified threshold;

displaying the reordered possible words of the combined input pool; and receiving user modification to a handwriting input to refine the possible words in the handwriting input pool.

19. An apparatus comprising:

input devices to receive an input word through a plurality of input modalities; and a processor coupled to the input devices, the processor to:

ascertain an input pool for each input modality, the input pool to contain possible words ordered based upon a probability of being the input word;

identify a highest probability word from each input pool, the highest probability word being a word that has a highest probability among the possible words in the input pool;
develop a first acoustic profile for the highest probability word of a first input pool;
develop second acoustic profiles for the possible words of a second input pool, each of the second acoustic profiles to correspond to one of the possible words of the second input pool;
compare the first acoustic profile of the first input pool with each of the second acoustic profiles of the second input pool; and
select the highest probability word of the first input pool as a recognized word in response to a determination that the first acoustic profile matches one of the second acoustic profiles.

20. The apparatus of claim 19, wherein the first input pool corresponds to an input modality of speech, and the second input pool corresponds to an input modality of handwriting in Chinese ideograms or pinyin.

21. The apparatus of claim 20, wherein the processor is further to:
develop an average acoustic profile for the possible words of the speech input pool;
develop an acoustic profile for each of the possible words of the handwriting input pool and the speech input pool to create a combined input pool;
calculate a difference between the average acoustic profile and each of the acoustic profiles of the combined input pool;
reorder the possible words of the combined input pool based upon the difference, such that the possible word of the combined input pool having an acoustic profile with a least difference from the average acoustic profile is ordered first; and
select a possible word produced by handwriting from the combined input pool, the selected possible word having the least difference among the possible words of the handwriting input pool and the least difference being below a specified threshold;
the apparatus further comprising:
a display to display the reordered possible words of the combined input pool; and
a handwriting input device of the input devices to receive user modification to a handwriting input to refine the possible words in the handwriting input pool.

\* \* \* \* \*